(12) United States Patent
Haimer

(10) Patent No.: US 10,525,560 B2
(45) Date of Patent: Jan. 7, 2020

(54) TOOL HOLDER

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 16/050,564

(22) Filed: Jul. 31, 2018

(65) Prior Publication Data

US 2018/0333817 A1  Nov. 22, 2018

Related U.S. Application Data

(63) Continuation of application No. 14/891,994, filed as application No. PCT/EP2014/059831 on May 14, 2014, now Pat. No. 10,058,965.

(30) Foreign Application Priority Data

May 22, 2013  (DE) .................. 10 2013 105 206

(51) Int. Cl.
  *B23C 5/28*    (2006.01)
  *B23Q 11/10*   (2006.01)
  (Continued)

(52) U.S. Cl.
  CPC .......... *B23Q 11/1023* (2013.01); *B23B 31/10* (2013.01); *B23B 31/11* (2013.01);
  (Continued)

(58) Field of Classification Search
  CPC . B23Q 11/1023; B23Q 11/10; B23B 2231/24; B23B 2250/12; B23B 31/11;
  (Continued)

(56) References Cited

U.S. PATENT DOCUMENTS 2,996,061 A  8/1961  Miller
3,460,410 A  8/1969  Briles
  (Continued)

FOREIGN PATENT DOCUMENTS

CN  202137617 U  2/2012
DE  4004150 A1  9/1990
  (Continued)

OTHER PUBLICATIONS

International Search Report dated Jul. 17, 2014 for PCT/EP2014/059831, filed May 14, 2014.
(Continued)

*Primary Examiner* — Sara Addisu
(74) *Attorney, Agent, or Firm* — Paul D. Bianco; Katharine Davis; Fleit Intellectual Property Law

(57) ABSTRACT

A tool holder has a main body and a holding pin onto which a rotary tool having a corresponding holding bore can be placed. At least one channel for transporting coolant or lubricant, the channel leading to the outer circumference of the holding pin, is arranged in the tool holder. In order to enable cooling of the cutting edges of the rotary tool without great production complexity, at least one longitudinal groove for conducting the coolant or lubricant in a longitudinal direction of the holding pin is arranged on the outer circumference of the holding pin.

13 Claims, 4 Drawing Sheets

(51) Int. Cl.
  *B23B 31/11* (2006.01)
  *B23C 5/26* (2006.01)
  *B23B 31/10* (2006.01)

(52) U.S. Cl.
  CPC .................. *B23C 5/26* (2013.01); *B23C 5/28* (2013.01); *B23B 2231/24* (2013.01); *B23B 2250/12* (2013.01); *B23C 2210/02* (2013.01); *B23C 2250/12* (2013.01); *B23Q 11/10* (2013.01)

(58) Field of Classification Search
  CPC ....... B23B 31/10; B23C 2250/12; B23C 5/28; B23C 5/26; B23C 2210/02
  See application file for complete search history.

(56) References Cited

U.S. PATENT DOCUMENTS

| | | |
|---|---|---|
| 3,609,931 A | 10/1971 | Voorhies |
| 3,874,808 A | 4/1975 | Zaccardelli et al. |
| 4,213,354 A | 7/1980 | Dahinden |
| 4,669,933 A | 6/1987 | Dye |
| 4,770,570 A | 9/1988 | Tsui et al. |
| 4,795,292 A | 1/1989 | Dye |
| 4,841,817 A | 6/1989 | Tsui |
| 5,358,360 A | 10/1994 | Mai |
| 5,378,091 A | 1/1995 | Nakamura |
| 5,716,053 A | 2/1998 | Lagerberg |
| 6,857,344 B1 | 2/2005 | Diller |
| 8,931,983 B2 | 1/2015 | Sharivker et al. |
| 2002/0009339 A1 | 1/2002 | Arvidsson |
| 2004/0013480 A1 | 1/2004 | Beckington |
| 2007/0077132 A1 | 4/2007 | Beckington |
| 2007/0127992 A1 | 6/2007 | Spichtinger et al. |
| 2008/0175677 A1 | 7/2008 | Prichard et al. |
| 2009/0123244 A1 | 5/2009 | Buettiker et al. |
| 2009/0226268 A1 | 9/2009 | Pilkington |
| 2011/0217131 A1 | 9/2011 | Bonnarang et al. |
| 2012/0009027 A1 | 1/2012 | Sharivker et al. |
| 2012/0141220 A1 | 6/2012 | Chen |
| 2012/0230781 A1 | 9/2012 | Hoffer et al. |
| 2012/0275876 A1 | 11/2012 | Lehto et al. |
| 2015/0217385 A1 | 8/2015 | Haimer |
| 2015/0283627 A1 | 10/2015 | Borapura |
| 2016/0074948 A1 | 3/2016 | Dudzinsky |

FOREIGN PATENT DOCUMENTS

| | | |
|---|---|---|
| DE | 4019506 A1 | 1/1992 |
| DE | 202 03 035 U1 | 5/2002 |
| DE | 10 2004 055377 A1 | 5/2006 |
| EP | 0579371 A1 | 1/1994 |
| GB | 2332161 A | 6/1999 |
| JP | S62192819 U | 12/1987 |
| JP | 2001087929 | 4/2001 |
| JP | 2005022063 A | 1/2005 |
| JP | 2008018486 A | 1/2008 |
| WO | 2009/140109 A2 | 11/2009 |

OTHER PUBLICATIONS

Result of German Search Report for German Application No. 10 2013 105 206.1, filed May 22, 2013.
English translation of Written Opinion, dated Nov. 22, 2015 for PCT/EP2014/059831, filed May 14, 2014.
International Preliminary Report on Patentability, dated Nov. 24, 2015 for PCT/EP2014/059831, filed May 14, 2014.

TOOL HOLDER

FIELD OF THE INVENTION

The invention relates to a tool holder and to a tool arrangement.

BACKGROUND OF THE INVENTION

A tool holder of the type in question is known from DE 40 19 506 A1. It has a main body and a holding pin onto which a rotary tool constructed as a cutting head and having a corresponding holding bore can be placed. A channel for transporting a coolant and/or lubricant and opening at the outer circumference of the holding pin is arranged in the tool holder. The coolant and/or lubricant is then transported to the cutters of the cutting head via a plurality of coolant bores in the cutting head. The rotary tool is mounted by means of a bolt that is screwed at the front end face of the holding pin into a corresponding centrally arranged mating thread in the holding pin, thus tensioning the rotary tool against the tool holder. In order to conduct coolant and/or lubricant to the cutting edges of the rotary tool, at least one channel for the coolant and/or lubricant is arranged in the annular ridge between the internal thread and the external thread. Particularly for smaller tool holders with smaller diameters of the holding pin, the rigidity and strength is additionally reduced by these coolant and/or lubricant channels, and therefore breakage cannot be reliably avoided. Angled bores must be introduced into the holding pin in order to produce these channels, which is extremely expensive. Furthermore, the hardening of the holding pin, which is usually necessary, is hampered by the small wall thicknesses in the coolant bore area, since stress cracks can easily form.

SUMMARY

One aspect of the invention relates to an economical and easily producible tool holder and a tool arrangement with such a tool holder that enables cooling of the cutting edges of the rotary tool without great production effort and expense.

Advantageous configurations of the invention are also disclosed.

The tool holder according to the invention is characterized in that at least one longitudinal groove for conducting the coolant and/or lubricant in the longitudinal direction of the holding pin to the front side thereof is formed on the outer circumference of the holding pin. The longitudinal grooves can run parallel to the longitudinal direction of the holding pin, but can also be helical. These longitudinal grooves, preferably formed with a cross section in the shape of a circular segment, can be produced more easily than is possible for the generally inclined bores from prior art.

At least one channel preferably opens at the transition of the holding pin to the main body. This guarantees that the predominant part of the holding pin does not undergo a reduction of cross section, and therefore does not lead to weakening through at least one channel.

In order to create a transition for the coolant and/or lubricant that is particularly low in friction and facilitates flow for the coolant and/or lubricant, the at least one channel preferably opens into a longitudinal groove.

In a particularly preferred embodiment, a plurality of longitudinal grooves that are connected by an annular groove running in the circumferential direction of the holding pin can be formed on the outer circumference of the holding pin. The coolant and/or lubricant can be distributed by the annular groove. This is particularly advantageous if the lubricant is conducted to the grooves with only a few channels and can then be distributed there. The lower number of channels in turn results in less weakening of the holding pin. For a transition of the coolant and/or lubricant that is low in friction and facilitates flow, the at least one channel preferably opens into a longitudinal groove. The annular groove can be arranged continuously or in sections on the outer circumference of the holding pin. The coolant and/or lubricant can be further distributed proceeding from the annular groove.

The holding pin can have a circumferential centering ridge on the outer circumference. This centering ridge is designed to cooperate in a force-fitting sealing manner with the rotary tool, so that passage of the coolant and/or lubricant at the centering ridge is suppressed. Reliable sealing can be achieved in this way.

To avoid an undesired escape of coolant and/or lubricant, the longitudinal groove and the annular groove can be arranged between a front, tool-side end face of the holding pin and the centering ridge. This enables reliable sealing between the holding pin and the rotary tool and ensures a flow of coolant and/or lubricant in the direction of the tool end face provided with the cutting edges. The front, tool-side end face of the holding pin is the free side that is inclined towards the pluggable rotary tool.

An annular thin-walled intermediate sleeve that at least partially covers the longitudinal groove and the annular groove can be arranged on the holding pin in order to further improve the flow guidance.

The intermediate sleeve can preferably be sealingly connected in a force-fitting manner to the holding pin so that the coolant and/or lubricant is always conducted to the end face of the holding pin, independently of the rotary tool. This is achieved, for example, by pressing or shrink-fitting the intermediate sleeve onto the holding pin. In addition to the above friction-fit connections, the intermediate sleeve can also be connected permanently or detachably to the tool holder by adhesion, a threaded connection or the like. Steel, brass, aluminum, plastic and the like can be used as material for the intermediate sleeve.

In another preferred embodiment, the intermediate sleeve can have, on the outer circumference thereof, a centering bead for centering the rotary tool. The centering bead deforms elastically during installation of the rotary tool and can thus center the rotary tool as well as having a damping effect.

In an advantageous embodiment, longitudinal and/or circumferential grooves for conducting coolant and/or lubricant can also be provided on the inner circumference of the intermediate sleeve.

Such intermediate sleeves are easy and economical to produce and therefore make it possible to form coolant and/or lubricant channels on the tool holder in a simple manner.

According to the invention a tool arrangement is also claimed, having a tool holder of the type described above and a rotary tool that has a holding bore. The invention provides that at least one tool-side longitudinal groove for transporting the coolant and/or lubricant in the longitudinal direction of the rotary tool is formed on the inner circumference of the holding bore. Thereby the flow cross section of the coolant and/or lubricant is enlarged, without reducing the cross section, and thus the stability, of the holding pin.

The at least one channel of the tool holder preferably opens into the at least one tool-side longitudinal channel of the rotary tool. This enables a flow-facilitating transport of the coolant and/or lubricant. A longitudinal groove of the rotary tool can likewise at least partially overlap a tool-side longitudinal or annular groove of the tool holder, whereby the cross section of the flow channels is enlarged, which likewise has a flow-facilitating effect. The at least one tool-side longitudinal groove can run parallel to the longitudinal direction of the rotary tool, but can also be helical.

BRIEF DESCRIPTION OF THE DRAWINGS

Additional details and advantages of the invention emerge from the following description of a preferred embodiment with reference to the drawings. In the drawing.

DETAILED DESCRIPTION OF THE INVENTION

Figure 1:
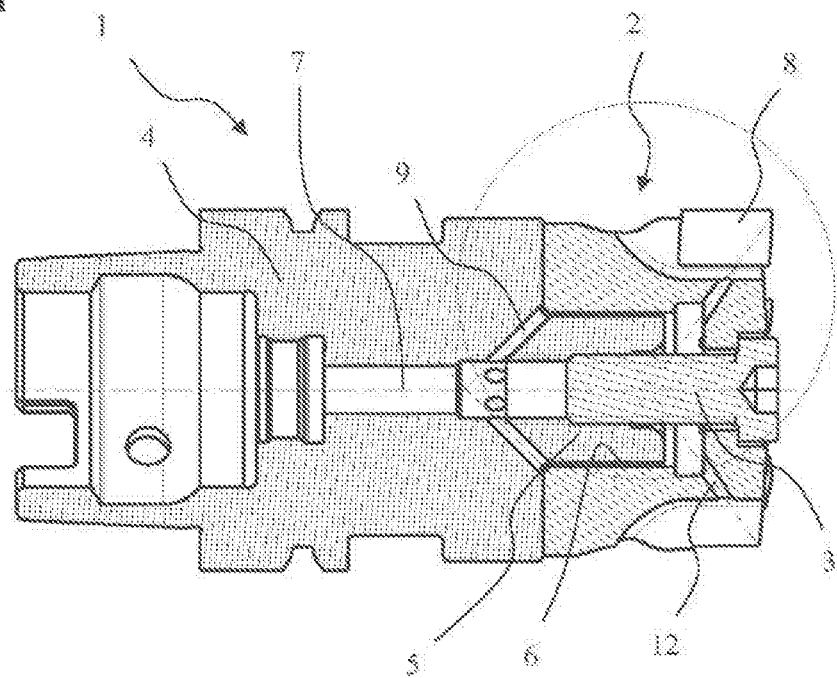
FIG. 1 shows a tool holder according to the invention with a rotary tool, in a longitudinal section.

FIG. 1 shows a tool holder 1, on which a rotary tool 2 is mounted by means of a clamping bolt 3. The tool holder 1 consists of a main body 4, at the front, tool-side end of which a holding pin 5 is arranged. The rotary tool 2 is constructed as a cutting head and has a holding bore 6 corresponding to the holding pin 5, such that the rotary tool 2 can be pushed onto the tool holder 1 and is retained and centered radially by the holding pin 5.

At the side of the tool holder 1 facing away from the rotary tool 2, clamping faces in the form of a positive taper lock interface for mounting the tool holder 1 in a spindle (not shown) of a machine tool are formed. Coolant and/or lubricant is conducted via a central cooling bore 7 from the spindle to the cutting edges 8 of the cutting head 2. Starting from the central cooling bore 7, channels in the form of radial bores 9 are provided, which open at the outer circumference of the holding pin 5 at the transition of the holding pin 5 into the main body 4 of the tool holder 1.

Figure 2:
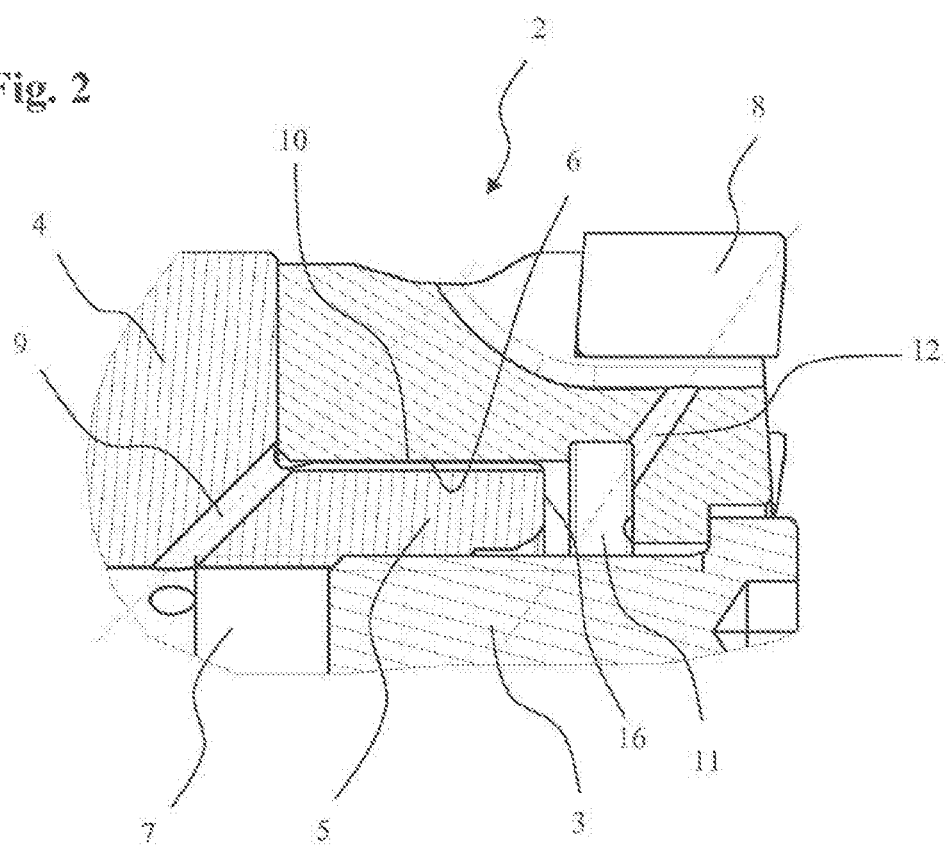
FIG. 2 shows a detail view of another embodiment of a the tool holder with the rotary tool from FIG. 1.

FIG. 2 shows a detail view of another embodiment of the tool holder 1. Proceeding from the radial bores 9, radial longitudinal grooves 10 for further conducting the coolant and/or lubricant are provided on the outer circumference of the holding pin 5, so that the coolant and/or lubricant is conducted between the holding pin 5 and the cutting head 2. An annular chamber 11, into which the longitudinal grooves 10 open and from which radial supply bores 12 guide the coolant and/or lubricant directly to the cutting edges 8 of the cutting heads head 2, is provided inside the cutting head 2.

Figure 3:
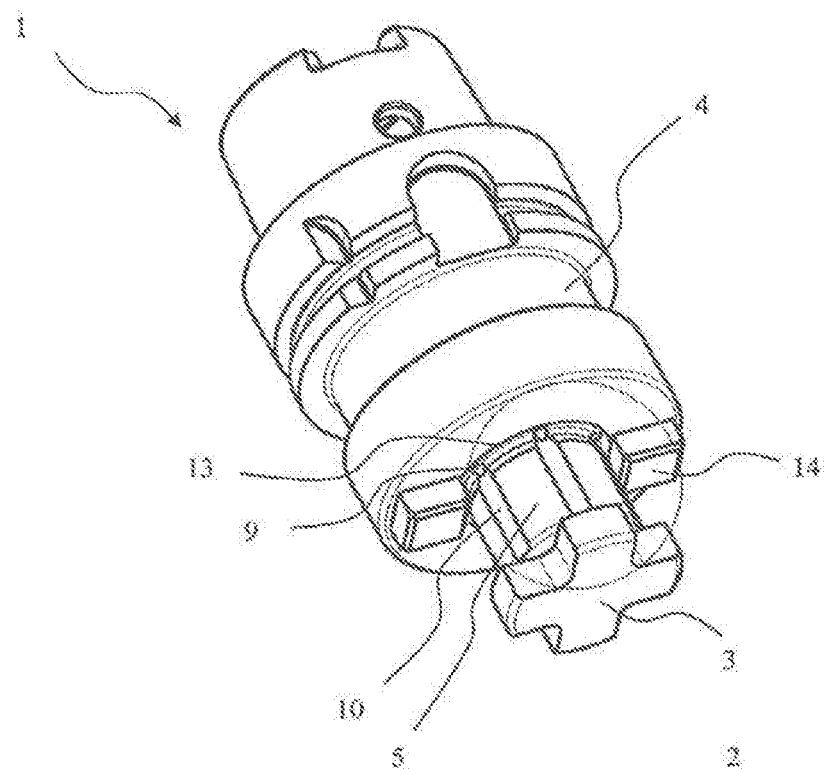
FIG. 3 shows a perspective view of the tool holder of FIG. 2 according to the invention.

FIG. 3 shows the progression of the longitudinal grooves 10 in a perspective view of the tool holder 1. Like the radial bores 9, the longitudinal grooves 10 are uniformly distributed across the circumference of the holding pin 5 and are oriented in the longitudinal direction of the holding pin 5. The longitudinal grooves 10 are also aligned with the outlet of the radial bores 9. For a better distribution of the coolant and/or lubricant, a radially circumferential annular groove 13 is provided and is arranged directly at the transition of the holding pin 5 into the main body 4. The annular groove 13 allows a pressure equalization between the different longitudinal grooves 10 and a uniform distribution of the coolant and/or lubricant to the longitudinal grooves 10.

Various means for rotationally fixed clamping of the cutting head are also shown in FIG. 3. The cutting head 2 usually has a radial transverse groove with which retaining elements 14 of the tool holder 1 engage when the tool holder 1 is being assembled. The clamping bolt 3, which tensions the cutting head 2 against the main body of the tool holder 1, is provided for securing the cutting head 2 in the longitudinal direction. Due to the standardized design of the cutting head 2 with the transverse groove, additional seals, not shown, can be arranged in the annular groove 13 in order to prevent undesired escape of coolant and/or lubricant via the transverse groove of the cutting head 2 past the retaining elements 14. It is alternatively also possible, however, to interrupt the annular groove 13 in the region of the retaining elements in order to prevent an unintended escape of coolant and/or lubricant.

Figure 4:
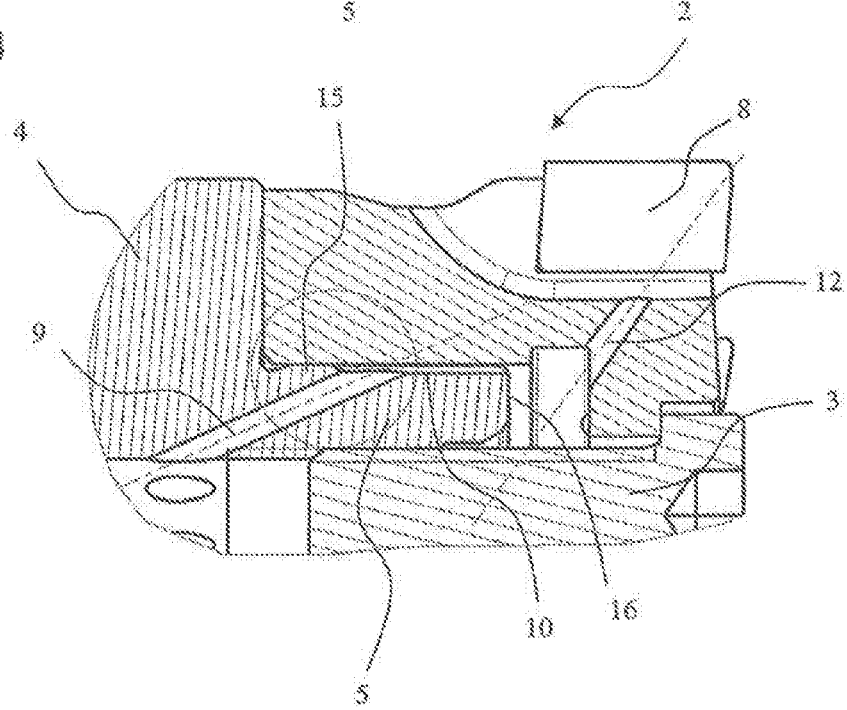
FIG. 4 shows a detail view of another embodiment of the tool holder with the rotary tool in a longitudinal section.

FIG. 4 shows another embodiment of the tool holder, in which the radial bores 9 likewise open into the radial circumference of the holding pin 5, but offset from the transition of the holding pin 5 into the main body 4. This makes it possible to provide a centering ridge 15 on the outer circumference of the holding pin 5 between the outlet of the radial bores 9 at the outer circumference of the holding pin 5 and the transition of the holding pin 5 into the main body 4. The centering ridge 15 is formed radially circumferentially and can deform elastically. The centering ridge 15 has an excess dimension in relation to the inside diameter of the holding bore 6 of the cutting head 2, so that a force-fitting sealing effect results and a passage of coolant and/or lubricant in the direction of the main body 4 is reliably prevented. The longitudinal grooves 10 and the annular grooves groove 13 are arranged between the tool-side front end face 16 of the holding pin 5 and the centering ridge 15. A good centering of the cutting head 2 on the tool holder 1 is also achieved by the elastic deformation of the centering ridge 15.

FIG. 4 shows another embodiment of the tool holder, in which the radial bores 9 likewise open into the radial circumference of the holding pin 5, but offset from the transition of the holding pin 5 into the main body 4. This makes it possible to provide a centering ridge 15 on the outer circumference of the holding pin 5 between the outlet of the radial bores 9 at the outer circumference of the holding pin 5 and the transition of the holding pin 5 into the main body 4. The centering ridge 15 is formed radially circumferentially and can deform elastically. The centering ridge 15 has an excess dimension in relation to the inside diameter of the holding bore 6 of the cutting head 2, so that a force-fitting sealing effect results and a passage of coolant and/or lubricant in the direction of the main body 4 is reliably prevented. The longitudinal grooves 10 and the annular grooves 13 are arranged between the tool-side front end face 16 of the holding pin 5 and the centering ridge 15. A good centering of the cutting head 2 on the tool holder 1 is also achieved by the elastic deformation of the centering ridge 15.

Figure 5:
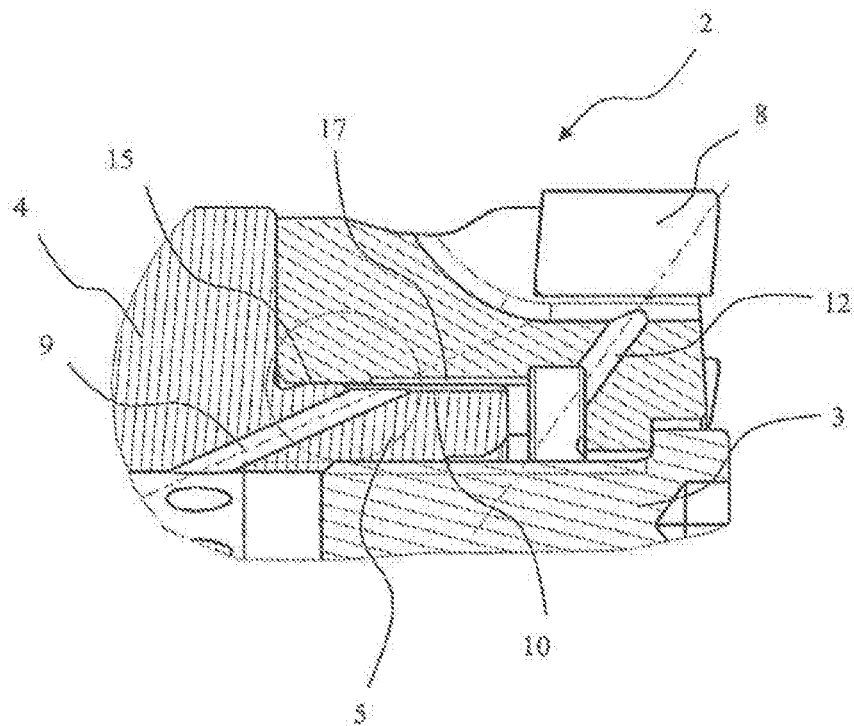
FIG. 5 shows a detail view of another embodiment of the tool holder with the rotary tool in a longitudinal section.

FIG. 5 presents a detail view of another embodiment of the tool holder. Unlike the embodiment in FIG. 4, the cutting head 2 in this case has tool-side longitudinal grooves 17 in the holding bore 6 that oppose the longitudinal grooves 10 of the holding pin 5. In sum, this results in an enlarged flow cross section for the coolant and/or lubricant without a reduction of the cross section of the holding pin 5. In an embodiment not shown here, the tool-side longitudinal grooves 17 can be arranged in the cutting head 2 offset in relation to the longitudinal grooves 10 of the holding pin 5. In this case, the coolant and/or lubricant can be distributed to the tool-side longitudinal grooves 17 through one or more annular grooves in the cutting head 2 or the holding pin 5, similar to the annular groove 13 in FIG. 3.

Figure 6:
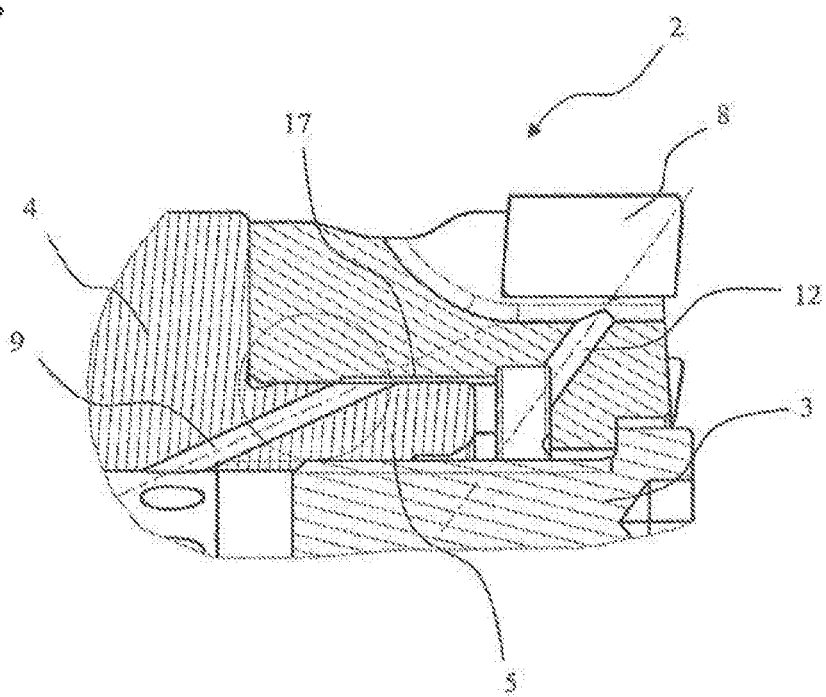
FIG. 6 shows a detail view of another embodiment of the tool holder with the rotary tool in a longitudinal section.

FIG. 6 shows an additional embodiment, in which the holding bore 6 of the cutting head 2 has the tool-side longitudinal grooves 17, but unlike the previous embodiments, there are no longitudinal grooves in the holding pin 5. Thereby the cross sectional area of the holding pin 5 is not reduced and therefore its strength is not diminished.

Figure 7:
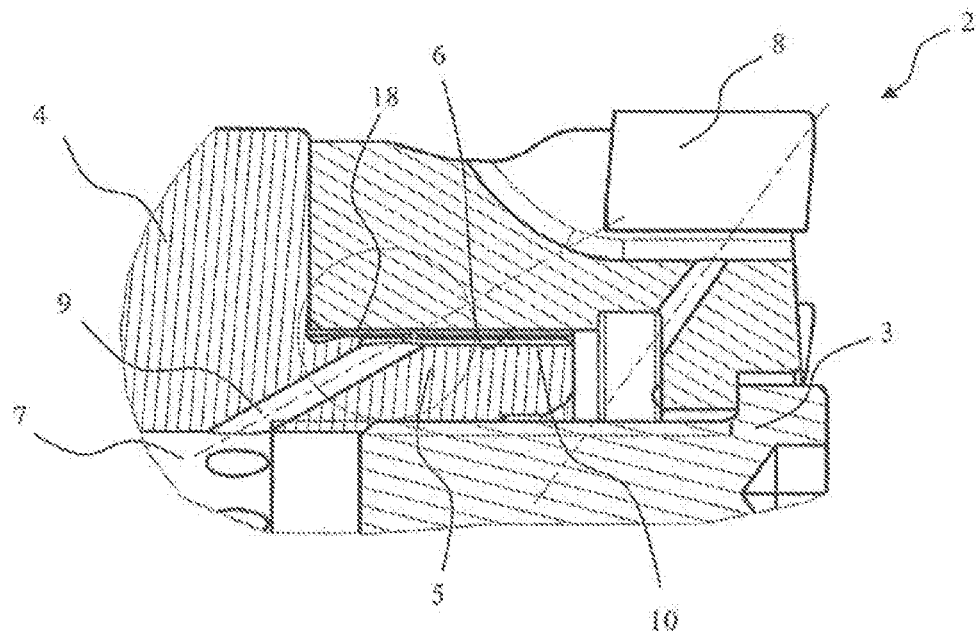
FIG. 7 shows another embodiment of the tool holder with the rotary tool and an additional intermediate sleeve.

FIG. 7 shows an additional embodiment of the tool holder 1 with the rotary tool 2. The structure fundamentally corresponds to FIG. 4, but with the difference that an intermediate sleeve 18 is arranged between the holding pin 5 and the holding bore 6.

Figure 8:
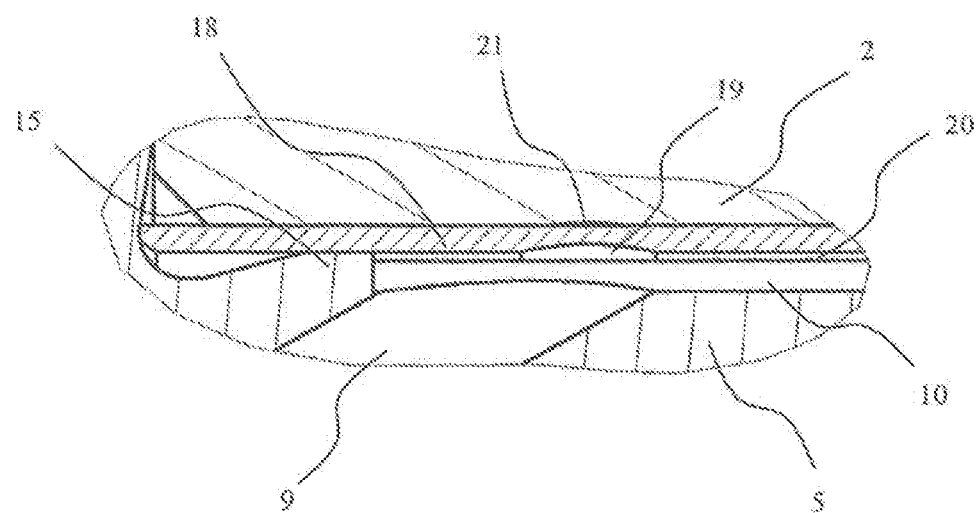
FIG. 8 shows a detail view of the intermediate sleeve from FIG. 7.

The structure of the intermediate sleeve 18 is illustrated in FIG. 8 in a detail view. As in the embodiment shown in FIG. 4, the holding pin 5 also has a centering ridge 15. The intermediate sleeve 18 is pushed onto this centering ridge 15 and seals in a force-fit manner against the holding pin 5 due to slight under-dimension. Longitudinal grooves 20, which are formed opposite from the longitudinal grooves 10 of the holding pin 5, comparably to the embodiment of FIG. 5, are formed in the intermediate sleeve 18. A circumferential annular groove 19 is also formed in the intermediate sleeve 18 for better distribution of the coolant and/or lubricant. To center the rotary tool 2 relative to the intermediate sleeve 18, the sleeve has, on its outer circumference, a centering bead 21 that is elastically deformable and has a damping effect, the bead being slightly crushed due to an over-dimension during assembly with the rotary tool 2.

Even though the specification and the figures consistently refer to a cutting head as the rotary tool 2, the invention is not limited thereto. All rotatable rotationally symmetrical machining tools with a holding bore for placement on a holding pin of a tool holder and which feed a coolant and/or lubricant to the cutting edges are considered a rotary tool within the meaning of the invention. These include milling and drilling tools in particular.

The intermediate sleeve can be used in conjunction with the holding pin according to the invention, but also with already known holding pins. In the latter case the sealing effect is secondary and instead the advantageous damping effect is primary.

The invention claimed is:

1. A tool holder having a main body and a holding pin onto which a rotary tool with a holding bore is positionable, wherein at least one channel opens at the outer circumference of the holding pin and is arranged for transporting coolant and/or lubricant in the tool holder, wherein at least one longitudinal groove for conducting the coolant and/or lubricant in the longitudinal direction of the holding pin is arranged on the outer circumference of the holding pin and wherein the at least one channel opens at the transition of the holding pin to the main body and opens into the at least one longitudinal groove.

2. The tool holder of claim 1, wherein the at least one longitudinal groove comprises a plurality of longitudinal grooves connected by an annular groove running in the circumferential direction of the holding pin.

3. The tool holder of claim 1, wherein the at least one channel opens into an annular groove.

4. A tool arrangement having the tool holder of claim 1, wherein the holding bore of the rotary tool, on the inner circumference thereof, has at least one tool-side longitudinal groove for conducting coolant and/or lubricant in the longitudinal direction of the rotary tool.

5. The tool arrangement of claim 4, wherein the at least one channel of the tool holder opens into the at least one tool-side groove of the rotary tool.

6. The tool arrangement of claim 4, wherein the at least one tool-side groove of the rotary tool overlaps the at least one longitudinal groove of the tool holder at least in part.

7. The tool holder of claim 1, wherein the rotary tool is a milling tool.

8. A tool holder having a main body, a holding pin onto which a rotary tool with a holding bore is positionable, and a clamping bolt securing the rotary tool to the tool holder, wherein at least one channel arranged for transporting coolant and/or lubricant in the tool holder opens at an outlet at the outer circumference of the holding pin offset from the transition of the holding pin into the main body, the at least one channel in fluid communication with at least one longitudinal groove arranged on the outer circumference of the holding pin for conducting the coolant and/or lubricant in the longitudinal direction of the holding pin, and wherein the holding pin has a circumferential centering ridge on the outer circumference, with the centering ridge located between the outlet of the at least one channel and the transition of the holding pin into the main body.

9. The tool holder of claim 8, wherein the at least one longitudinal groove comprises a plurality of longitudinal grooves connected by an annular groove and wherein the plurality of longitudinal grooves and the annular groove are arranged between the front end face of the holding pin and the centering ridge.

10. The tool holder of claim 8, wherein the rotary tool is a milling tool.

11. A tool holder comprising:
a main body;
a holding pin onto which a rotary tool with a holding bore is positionable;
at least one channel opening at the outer circumference of the holding pin and arranged for transporting coolant and/or lubricant in the tool holder;
a plurality of longitudinal grooves in fluid communication with the at least one channel arranged on the outer circumference of the holding pin for conducting the coolant and/or lubricant in the longitudinal direction of the holding pin;
an annular groove on the outer circumference of the holding pin,
wherein an annular thin-walled intermediate sleeve, which covers the plurality of longitudinal grooves and the annular groove at least in part, is arranged on the holding pin.

12. The tool holder of claim 11, wherein the intermediate sleeve is sealingly connected in a force-fitting manner to the holding pin.

13. The tool holder of claim 11, wherein the intermediate sleeve, on the outer circumference thereof, has a centering bead for centering the rotary tool.

* * * * *